March 6, 1951  P. V. PALMQUIST ET AL  2,543,800
REFLEX LIGHT REFLECTOR
Filed Dec. 5, 1947
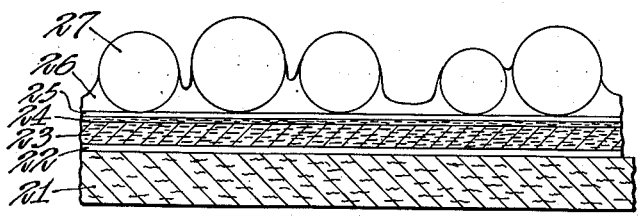
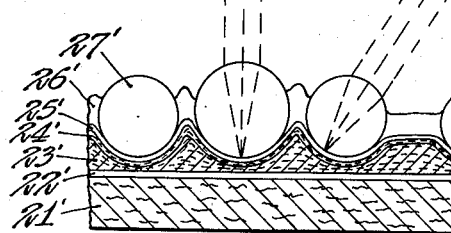
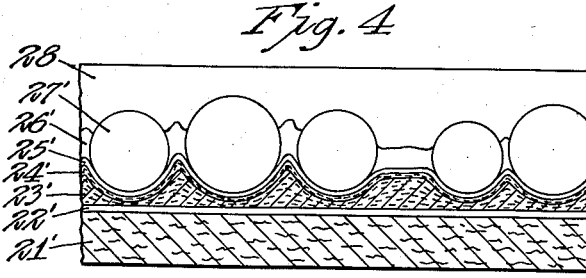
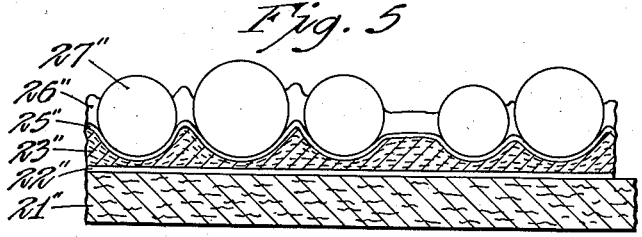
Inventors
Philip V. Palmquist
Raymond E. Penrod
By Carpenter, Abbott, Coulter & Kinney
Attorneys Patented Mar. 6, 1951

2,543,800

UNITED STATES PATENT OFFICE 2,543,800

REFLEX LIGHT REFLECTOR

Philip V. Palmquist, New Canada Township, Ramsey County, and Raymond E. Penrod, Minneapolis, Minn., assignors to Minnesota Mining & Manufacturing Company, St. Paul, Minn., a corporation of Delaware Application December 5, 1947, Serial No. 789,976

2 Claims. (Cl. 88—82)

This invention relates to reflex light reflectors of the class having a catadioptric structure wherein a layer of minute transparent sphere lenses (glass beads) is partially embedded in a film structure containing light-reflective pigment underlying the spheres so as to produce, in combination, refraction and reflection of incident light beams. Such reflectors have the property of directing a brilliant cone of light back toward the source of an angularly incident beam of light (see Fig. 1). Road signs and markers of the reflex type have greater visibility at night to the occupants of an approaching vehicle, since the reflected light is concentrated in a narrow cone which automatically returns toward the headlights and occupants of the vehicle.

The present invention provides a new and useful colored type of reflex reflector arrangement which has a novel combination of structural optical elements so related as to provide high-brilliancy wide-angularity reflection properties. The reflector emits colored light of high brilliancy even when the incident beam of light strikes the sphere layer at a large angle from the perpendicular (normal), as viewed by persons near the axis of the incident beam.

A particularly advantageous feature of the present construction is that it permits of making red reflector sheets of great brilliancy and wide-angularity without sacrifice of the desired purity and intensity of color. The night-time reflex-reflection appearance is crisp, live and vibrant, which is especially important in danger signs and markers. This effect cannot be obtained by using a reflective layer (underlying the spheres) containing red reflective color pigment, owing to the light-absorption and reflection characteristics of such arrangements. However, it will be understood that the present construction is not limited to red reflectors, but can be employed to advantage in making reflectors of other hues, such as orange, yellow, green and blue.

The practical value of this invention is due to our discovery that it is possible to manufacture in a commercially feasible fashion a beaded sheet material having a complex multi-layer continuous-film structure formed of a plurality of coated layers, including a binder coating for the spheres, a thin transparent colored coating conforming to and bonded to the inner portions of the spheres, and an underlying semi-specular reflective layer bonded and molded thereto so as to provide a concave reflector surface approximately concentric to the inner surface of each sphere and spaced therefrom by a distance equal to a small fraction of the sphere diameter.

The invention involves the discovery that the previously mentioned optical characteristics can be secured by means of such a catadioptric structure wherein the minute sphere lenses have a refractive index of approximately 1.9, the transparent undercoating contains transparent color pigment, and the reflective layer contains metallic flake pigment.

The apparent difficulties involved in the manufacture of such a reflector structure can be partly appreciated by bearing in mind that the glass spheres preferably have an average diameter of less than 10 mils (i. e. less than 0.010 in.) which means that there are upwards of 10,000 per square inch. This obviously prevents using various structural arrangements and manufacturing techniques which could be used in making products employing relatively large spheres, such as those used in reflector buttons.

An important feature of this invention is that continuous flexible sheet reflector material can be fabricated in any desired length. This sheeting can be produced in a thin but self-sustaining flexible film form (not including paper or cloth as a permanent element) which is weatherproof and stretchable, adapted for application to desired bases (including embossed sheet metal bases) in the making of highway signs and markers. A film strip of the red type can readily be cemented by a motorist to the rear bumper of his car as a warning marker which will attract attention at great distances on the highway at night owing both to its brilliancy and to the relatively large area that can be provided. This material can also be used as a marker for the rear mudguard of bicycles to greatly minimize the danger of being run down at night.

The invention can best be described and explained in connection with the accompanying illustrative diagrammatic drawings, wherein:

Fig. 1 shows in diagram form a reflex reflector sheet 10 and the concentrated cone of brilliant reflex-reflected light returning toward the source of an angularly incident ray or beam. The action is quite different from that of a mirror which causes specular reflection, and from that of a reflective diffusing surface which causes the reflected light to spread out in all directions.

Fig. 2 is a highly magnified diagram view showing the structure of a flexible reflex reflector sheet at an intermediate stage of manufacture, just prior to the calendering step.

Fig. 3 shows the structure of the same sheet in final form upon completion of manufacture, the structural changes being evident by comparison with Fig. 2.

Fig. 4 shows a different species which has the same physical structure as the sheet of Fig. 3 except that a transparent coating has been applied over the layer of spheres to provide a flat top surface.

Fig. 5 shows a reflector sheet structure which is the same as that of Fig. 3 except that it has been simplified by omitting one coating.

Referring to Figs. 2 and 3, this illustrative sheet has a non-fibrous film construction which is self-sustaining but is temporarily attached to a smooth-surfaced removable carrier sheet 21 upon which the coatings are built up, and which can be peeled off when desired after manufacture has been completed. The film coatings are applied as shown in Fig. 2. The first is a thin back size coating 22, which is cast upon the carrier sheet and facilitates ultimate stripping. The second is a moldable cushion layer coating 23. The third is a flector coating 24 which includes metallic flake pigment particles which tend to lie flat and which provide a semi-specular metallic reflection characteristic (silvery reflection in the case of aluminum pigment). The fourth coating is a thin transparent color film 25 containing transparent color pigment, which also serves to space the spheres from the reflector coating. The fifth is a transparent binder layer 26, which likewise contains transparent color pigment, in which is partially embedded a single surface layer of minute transparent spheres 27, having a refractive index of approximately 1.9. The latter are pressed in while the binder coating is still in a plastic condition (before curing) and the back extremities touch the underlying transparent color film. The binder coating at this stage is in a relatively soft or plastic condition so as to permit of the structural transformation still to be described, but is sufficiently cohesive to hold the spheres in position.

The sheeting in this form is next subjected to high pressure to force the spheres down into the underlying film structure, as by calendering. The cushion layer 23 is yieldable and becomes indented behind each sphere to form a concave die which forces the interposed color film 25 and reflector coating 24, each of which is stretchable, around the back portion of the sphere in concentric fashion. Even though there are upwards of 10,000 spheres per square inch, this operation effectively provides each sphere with a concave back reflector spaced therefrom by an interposed transparent color film, and without rupturing the coatings. To prevent a restoration of the original structure upon release of the pressure, it is necessary that the cushion layer 23 be relatively inelastic and be capable of subsequent annealing to relieve internal stresses that would otherwise cause a gradual forcing out of the indented material. This problem will be discussed in more detail later on.

Fig. 3 shows the reflector sheet in its final structural form produced by this shaping procedure. The same reference numerals are used as in Fig. 2 but have been primed. The sheet is heated to fully cure the binder coating 26' and to anneal the cushion layer 23', and upon cooling it is in stabilized condition ready for use. The carrier sheet 21' is removed prior to application of the reflector sheet to the base surface to which it is ultimately bonded in making a sign or marker.

In Fig. 3, the light rays a represent paraxial rays from a distant light source approaching the outer exposed face of a particular sphere in a direction normal to the plane of the reflector sheet. Owing to spherical and chromatic aberration effects, these incident rays cannot be brought to a true focus. But a sphere lens of refractive index approximating 1.9 will refract the rays so that they converge and strike the rear surface of the sphere within a small area zone, as shown. The rays proceed through the transparent color film, which has a thickness of less than 1 mil, and are reflected by the metallic flake pigment particles of the concave reflector coating. These metallic flakes tend to face toward the surface of the sphere and provide efficient semi-specular reflection, which occurs while the rays are closely focused and near the sphere surface. The reflected rays (except for those which are scattered) form a divergent cone of rays and proceed through the color film and the sphere and are refracted at the front surface of the latter so to be concentrated in a narrow cone having substantially the same axis as the incident rays. The colored light rays emitted from all of the spheres form a total cone of rays of limited divergency which proceeds toward the light source.

The paraxial rays b are shown striking the outer surface of an exposed sphere at a substantial angle to the normal, with the result that the rays converge to an axial "point" on the side under-surface of the sphere, and are colored and reflected in a manner similar to the a rays owing to the concave shape of the color film and the reflector coating. The colored reflected rays return toward the angularly positioned light source in the manner just described for normally incident rays. This accounts for the "reflex" reflection characteristic and its efficiency even at wide angles. This wide-angularity property is not obtainable in the intermediate Fig. 2 structure owing to the flatness of the reflector coating.

Persons located so that their lines of sight are close to the axis of the illuminating beam will see the reflector sheet as a brilliant colored area whose visibility far exceeds that of an ordinary painted sheet. The minute size of the spheres prevents distinguishing them and the reflector sheet appears as through continuously coated with a brilliant colored paint.

When viewed by daylight, the sheet also has a continuous colored appearance. In this latter case the sheet is illuminated by diffused light (i. e. light rays coming from various directions) and the appearance is similar to that of a painted surface having minute surface irregularities. Part of the effective daylight reflection occurs from rays striking the colored binder layer between the spheres, as well as from rays striking and penetrating the spheres.

The minute size of the spheres makes for a relatively smooth surface which is adapted to be readily painted, printed or screen processed in sign making to provide, for example, lettering or symbols. The covered-over areas will not be reflex-reflecting, but nevertheless will be plainly visible at night even at long distances, by contrast with contiguous reflex-reflecting areas.

Fig. 4 shows a different species of reflector sheet which is made by taking a sheet having the Fig. 3 structure and applying a transparent coating 28 over the layer of spheres 27', which bonds to and conforms to the exposed front surfaces of the spheres and the binder coating 26'. This coating is applied in sufficient amount so that upon hardening it has a flat outer front face. In this case the spheres must have a higher absolute refractive index than do those of the Fig. 3 structure in order to permit of proper light refraction at the front surfaces and the obtaining of the desired internal optical properties. This means that the spheres should have a refractive index approximately 1.9 times the refractive index of the covering coating 28, corresponding to the fact that the spheres in the Fig. 3 structure have a refractive index of approximately 1.9 times the refractive index of the contacting air. In both cases the effective relative refractive index of the spheres is approximately 1.9 and incident paraxial light rays are converged by refraction to approximate "point" zones at the back surfaces of the spheres. For additional details on reflex reflector sheets which have a flat front face, reference may be made to the Palmquist, Cross and Netherly Patent No. 2,407,680 issued Sept. 17, 1946.

Fig. 5 shows a reflector sheet structure which is the same as that of Fig. 3 except that the reflector coating 24' has been omitted. The remaining elements are designated by the same reference numerals, which have been double-primed. In this case the front surface portion of the cushion layer 34" provides a semi-specular reflective surface molded and bonded to the back surface of the color film 25" which it directly contacts, and thus serves the function of the reflector coating 24' of Fig. 3. The desired reflection characteristic is obtained by including metallic flake pigment particels in the composition of the cushion layer. This pigment also serves to improve the molding performance of the cushion layer, as hereinafter described. The intermediate structure is the same as that of Fig. 2 but with reflector coating 24 omitted, and it is likewise transformed by pressurizing.

A more detailed discussion will now be given of certain of the factors involved in making reflex reflector sheets of the present type.

The transparent color film 25 of Fig. 2 (25' of Figs. 3 and 4), and 25" of Fig. 5, is compounded of a transparent film-forming material in which is intimately admixed finely divided transparent color pigment particles in a high concentration to produce the desired intensity of color in the reflected light. The color pigment should preferably have a refractive index close to that of the film-forming material in order to obtain maximum transparency of the color film. Synthetic high-polymer compounds are suitable for the film-forming material. The coating composition is given a coatable viscosity by dispersing in a volatile solvent which is evaporated after application. The dried pigmented film must be tough, highly cohesive and stretchable so that it will not rupture and will not be squeezed out when the spheres are forced down in the pressurizing stage of manufacture. It has been discovered that the pigment has the additional desirable function of mechanically reinforcing the film component so as to aid in producing the desired result. Highly thermoplastic film-forming materials are undesirable. It is desirable to use a film-forming elastomer material which does not require a plasticizer or, if a plasticizer is used, which is thermo-hardening, thereby permitting heating during the pressurizing step without unduly softening the color film. An example of a preferred type of film-forming composition is polyvinyl butyral elastomer (unplasticized). Another example is a thermo-hardening urea-formaldehyde resin plasticized with castor oil so as to have the necessary flexibility and stretchiness.

This color film preferably has a thickness not exceeding the order of one-tenth of the average diameter of the spheres. If it is made too thick, the brilliancy of reflex reflection will be substantially reduced owing to the high refractive index of the spheres. If it is made too thin, the color filter action will be substantially reduced and the color appearance will be weak even though the color pigment concentration is high. As an illustration of a useful thickness, excellent results have been obtained with a film having a thickness of about 0.4 mil, containing 50% by weight of red pigment, using glass beads of about 1.90 refractive index, having an average diameter of approximately 5 to 7 mils.

The reflector coating 24 of Fig. 2 (24' of Figs. 3 and 4) may have a composition similar to that of the underlying cushion layer, except that it is mandatory that it include metallic flake pigment (such as aluminum pigment) admixed with a transparent film-forming material in order to have the desired reflection characteristics. A suitable film-forming component is the polyvinyl butyral elastomer mentioned above, which imparts a tough, flexible and stretchable characteristic, and which in this case may be plasticized. A strong bonding together of the two layers is assured by employing film-forming components which are the same, or which if different are compatible.

The moldable cushion layer 23 of Fig. 2 (23' of Figs. 3 and 4), which serves as a resilient die to shape the color film and reflector coating around the back portion of each sphere, must be sufficiently yieldable to allow of the necessary indentation when reasonable pressures are employed, and yet it must have sufficient internal strength to perform the function of a flexible die for the shaping of the color film and reflector film. A soft plastic layer would not serve. On the other hand, a highly elastic rubbery type of cushion layer would have a high retractive action and would tend to rapidly regain its initial shape as soon as the pressure was released, thereby causing the Fig. 3 structure to revert to the Fig. 2 structure. A further requirement is that the cushion layer in the final product (as shown by 23' in Figs. 3 and 4), should be flexible to permit of making pliable reflector sheets, and must also be stretchable if a stretchable composite sheet is to be made, and must have adequate tensile strength. It should form a good bond with the reflector coating to prevent delamination.

A cushion layer which is thermo-plastic (moldable when heated under pressure) and yet which has a limited degree of elasticity has been found to be highly suitable. Effective use can be made of polyvinyl butyral elastomer (previously mentioned as a desirable film-forming component for the color film and the reflector coating), which in this case contains a small proportion of a plasticizer to make it softer and more moldable when heated than would otherwise be the case. This plasticized material still has substantial elasticity. In order to reduce the rate of regain after deformation, it is compounded with a solid filler in finely divided form, the particles of which serve as "keys" in the internal structure of the mixture combination. A preferred filler for this purpose is finely divided metallic flake pigment, such as aluminum pigment. A suitable but somewhat less effective filler is asbestine (a talc used in paint compounding). This type of cushion layer composition has the advantage that the reflector sheet can be heated to an elevated temperature (below the melting point of the layer composition), following the pressurizing step, during which it becomes "annealed," i. e. the internal stresses produced by the pressurizing deformations are relieved, so as to prevent any tendency toward regain of the original shape, thereby stabilizing the structure. This final heating of the sheet product may be employed to simultaneously "anneal" the reflector coating, and to simultaneously give a final cure to a thermo-setting type of bead binder coating (26' in Fig. 3) so as to harden it and provide for maximum weatherproofness.

The same considerations apply in respect to the cushion layer 23" of the Fig. 5 type of structure, except that it is necessary to employ a metallic flake pigment, such as aluminum pigment, as the filler in order to obtain the desired light reflecting properties, since in this case the cushion layer also provides the reflective surface.

A preferred way of pressurizing the intermediate sheet (such as is shown in Fig. 2) to transform it to the final form (such as is shown in Fig. 3) is to employ pressure-calendering. Use may be made of a three-roll calender having steel rolls equipped for internal hot water heating, such as is used in the rubber industry. The sheet material is threaded over and around the top roll, through the nip and back around the center roll, and forwardly through the bottom nip and down around the bottom roll, with the beaded face in contact with the top and bottom rolls, and the carrier sheet in contact with the center roll. The top and bottom rolls are maintained at a warm room temperature and the center roll at the desired higher temperature. The nip pressure is adjusted to produce the required transformation. The proper pressure can most readily be determined by trial for any given case, by measuring the reduction in caliper thickness, by inspecting the product microscopically, and by observing its reflectorizing properties. The forming of the reflector surface to a concave shape behind each sphere results in increased reflection brilliancy for angularly incident light beams, in comparison to the brilliancy for normally incident light, as previously pointed out. Hence the extent to which wide-angularity reflection brilliancy is achieved is a direct indication of the extent to which the internal structural change has been made by the calendering.

The nature of the invention will further appear from the following detailed description of an illustrative specific example.

Example

This example illustrates the making of a weatherproof, flexible and stretchable film type of colored reflex reflector sheeting of the kind shown in Fig. 3, adapted to be manufactured in continuous web form and supplied in rolls, which may be readily cut into sheets or shapes of desired configuration for affixing to base surfaces in the making of signs and markers. All parts are by weight.

The carrier web is prepared from a highly calendered hard-surfaced paper (such as 70 lbs. per ream Fourdrinier paper) which is coated with a 40% solution of polystyrene resin in xylol solvent in the amount of about 5 to 7 grains per 24 sq. in. (wet weight) followed by oven drying. This coating adheres tenaciously to the paper and provides a smooth casting surface for the subsequent coating operations.

The back size coating of the reflector sheet (which permits of ultimate dry-stripping of the reflector sheet from the carrier web) is then formed by coating the carrier web with a 10% solution of polyvinyl butyral elastomer in ethylene-glycol monethyl-ether solvent in the amount of about 18 to 24 grains per 24 sq. in. (wet weight) followed by oven drying. An example of a commercially available polyvinyl butyral composition useful in this and subsequent coatings is the X-1 grade of Vinylite sold by Carbide & Carbon Chemicals Corp.

Upon this coating is next formed the cushion layer coating by applying the following composition with a wet weight of about 52 to 56 grains per 24 sq. in. followed by oven drying (for example, 12 minutes at 150° F. and 24 minutes at 170° F.):

| | Parts |
|---|---|
| Polyvinyl butyral | 15.0 |
| Dioctyl phthalate (plasticizer) | 5.0 |
| Aluminum pigment (30XD grade) | 15.0 |
| Ethylene-glycol monoethyl-ether (volatile solvent | 85.0 |

The reflector coating is next formed by applying the following composition with a wet weight of about 8 to 10 grains per 24 sq. in. followed by oven drying (for example, 12 minutes at 150° F. and 24 minutes at 170° F.):

| | |
|---|---|
| Polyvinyl butyral | 22.5 |
| Dioctyl phthalate | 11.25 |
| Aluminum pigment (30XD) | 15.0 |
| Transparent red pigment | 11.25 |
| Ethylene-glycol monethyl-ether | 119.0 |

In the above formulation, as also in the one given hereafter for the color film, an example of a suitable transparent red pigment is p-nitro o-toluidene coupled with 2 hydroxy naphthoic acid 3 o-toluidene. An illustrative commercially available pigment of this type is "India Red Toner X-1974," sold by Imperial Paper & Color Corp. The use of transparent color pigment in the reflector coating is optional. It provides a deeper reflected color effect, owing to the light-filtering action of these pigment particles upon the light rays in the reflector coating. The color pigment particles are much smaller than the aluminum pigment flake particles and some of them will be dispersed in portions of the transparent film body which overlie aluminum flake particles of the coating. The omission of the color pigment in this coating can be compensated for, to obtain the same color effect, by increasing the ratio thereof in the overlying color film. This entire reflector coating can be omitted, reliance then being placed upon the cushion layer (which contains aluminum pigment as above set forth) to provide a reflective surface (thereby finally obtaining the structure illustrated in Fig. 5).

The color film coating is next formed by applying the following composition with a wet weight of about 7 to 8 grains per 24 sq. in. followed by oven drying (for example, 2 minutes at 160° F., and 2 minutes at 180° F.):

| | |
|---|---|
| Polyvinyl butyral | 6.5 |
| Transparent red pigment | 6.5 |
| Ethylene-glycol monethyl-ether | 87.0 |

The bead binder coating is next applied having a wet coating weight of about 5 to 7 grains per 24 sq. in., using the following formulation:

Solution of thermo-setting urea-formaldehyde resin in volatile solvent (50% solids) _ 66.7
Heavy blown castor oil (plasticizer) _____ 33.0
Transparent red pigment _____ 3.0
Xylol (volatile solvent) _____ 50.0

An example of a commercially available urea-formaldehyde resin solution is the No. 227-8 grade of "Beetle," sold by American Cyanamid Co., which is a 50% by weight solution of thermo-setting urea-formaldehyde resin in a volatile solvent composed of 60 parts butyl alcohol and 40 parts xylol.

The coated web is heated for one minute at 150° F. to remove part of the solvent from the freshly applied binder coating composition. With the coating still in an uncured and plastic condition, transparent glass beads of approximately 1.90 refractive index and of No. 11 size (average diameter of about 5 to 7 mils) are applied to form a single packed layer, the excess being removed, and are pressed into the binder so as to contact the color film, by passing the coated sheet between a pair of squeeze rolls (one being steel and the other rubber-covered). The beaded web is then given an oven heating of 10 minutes at 210° F. to further dry and partially cure the bead binder coating, which is now firm enough to properly hold the glass beads but soft enough to allow ready deformation in the subsequent calendering operation. The web now has the structure shown in Fig. 2 and is ready for forming the final structure shown in Fig. 3.

At this stage, the coatings underlying the spheres have approximately the following thicknesses as determined from represenative samples: back size coating 0.6 mil, cushion layer 1.8 mils, refector coating 0.5 mil, color film coating 0.4 mil. Thus in this case the color film, which spaces the back extremities of the spheres from the reflector coating, has a thickness of about one-fifteenth of the average diameter of the spheres.

The web is now calendered, using a three roll calendar threaded so that the beaded side contacts the top and bottom rolls, which are maintained at a warm room temperature. The center roll is held at about 160 to 170° F. The pressure is adjusted so as to decrease the caliper thickness by about 3.5 mils; the best value being determined by inspection of the product as previously explained. The calendered web is then oven heated for 30 minutes at 140° F. and 60 minutes at 200° F.; thereby simultaneously completing the cure of the bead binder coating and stabilizing the cushion layer and the reflector coating so as to avoid retraction.

The reflector sheet can be stripped from the paper carrier web and the latter re-used, the reflector sheet being fully self-sustaining. A typical red reflector sheet, made as described, has a caliper thickness of about 6.5 mils, a tensile strength of about 7 lbs. per inch width and a stretch value (at rupture) of 10%. When the illumination direction is at an angle of 40° to the normal, the reflex reflection brilliancy is 87% as high as for normal (perpendicular) incidence, showing the excellent wide-angularity characteristic.

Further examples of light-fast transparent color pigments are the phthalocyanine pigments, which are especially effective in making green and blue reflectors.

The aluminum pigment is a preferred species of reflective metallic flake pigment but it will be understood that other species can be used as equivalents in keeping with the principles of the invention. For example, a yellow bronze flake pigment may be used, in combination with a transparent yellow color pigment in the color film, in making a reflector having a clear yellow color, thereby avoiding the greenish cast that would be imparted in this case if silvery aluminum pigment were used.

It will be understood that each class of pigment may consist of a blend of two or more specifically different pigments. For example, a mixture of aluminum flake pigment and bronze flake pigment may be used as the metallic flake pigment constituent of the reflector coating and also of the cushion layer. Mixtures of transparent color pigments of different hues may be used in the transparent color film and in the bead binder coating. The transparent film body material of the bead binder coating, of the color film, and of the reflector coating, may be tinted by a dye to modify the coloration, and tinted spheres may be used for the same purpose. Such combinations permit of additional variations in and control of the color appearance of the reflex reflector.

The transparent bead binder coating need not contain coloring material, since this primarily affects only the day appearance and, moreover, the light rays striking the front surface of this coating will penetrate to the color film and will be reflected by the underlying reflector coating, thereby being colored. The inclusion of the color pigment intensifies the day appearance color effect and for that reason is a preferred expedient. A day appearance which is different in color than the night reflex-reflection appearance can be obtained by including in the binder coating a pigment of different hue than the pigment incorporated in the color film.

Having described various embodiments of the invention, for purposes of illustration rather than limitation, what we claim is as follows:

1. A flexible and stretchable colored reflex light reflector sheet adapted to be made in roll form and to be readily cut into pieces in making outdoor signs and markers, comprising a beaded self-sustaining non-fibrous film structure having a single layer of minute transparent spheres whose effective refractive index is approximately 1.9, there being upwards of 10,000 per square inch; a continuous transparent color film shaped and bonded to the inner surfaces of the spheres and compounded of a substantially non-thermoplastic flexible and stretchable film-forming composition blended with transparent color pigment, the thickness of said color film being less than one mil; a transparent flexible and stretchable thermosetting binder coating containing transparent color pigment, overlying said color film and located between the spheres to hold them in position with the front surfaces of the spheres projecting therefrom; an underlying flexible and stretchable reflector coating compounded of transparent film-forming material blended with metallic flake pigment, shaped and bonded to the back surface of said color film to provide a continuous semi-specular reflective surface which is concentric to the back surface of each sphere; and an underlying flexible and stretchable moldable cushion layer indented behind each sphere and shaped and bonded to the back surface of said reflector coating, the cushion layer being compounded of a thermoplastic plasticized elastomer blended with a finely divided solid filler and being in an annealed state so that it is substantially free of any tendency to eject the indented spheres; said reflector sheet having been pressurized during manufacture so as to force the spheres into the underlying film structure and cause the thereby indented cushion layer, serving as a resilient and yieldable die, to stretch the color film and reflector coating around the back portion of each sphere, and having thereafter been heated to cure the binder coating and anneal the cushion layer, thereby stabilizing the structure in the previously described final state.

2. A flexible and stretchable colored reflex light reflector sheet adapted to be made in roll form and to be readily cut into pieces in making outdoor signs and markers, comprising a beaded self-sustaining non-fibrous film structure having a single layer of minute transparent spheres whose effective refractive index is approximately 1.9, there being upwards of 10,000 per square inch; a continuous transparent color film shaped and bonded to the inner surfaces of the spheres and compounded of a substantially non-thermoplastic flexible and stretchable film-forming composition blended with transparent color pigment, the thickness of said color film being less than one mil; a transparent flexible and stretchable thermosetting binder coating containing transparent color pigment, overlying said color film and located between the spheres to hold them in position with the front surfaces of the spheres projecting therefrom; and an underlying flexible and stretchable moldable cushion layer indented behind each sphere and shaped and bonded to the back surface of said color film, the cushion layer being compounded of a thermoplastic transparent plasticized elastomer blended with metallic flake pigment and being in an annealed state so that it is substantially free of any tendency to eject the indented spheres, the cushion layer providing a continuous semi-specular reflective surface which is concentric to the back surface of each sphere; said reflector sheeting having been pressurized during manufacture so as to force the spheres into the underlying film structure and cause the thereby indented cushion layer, serving as a resilient and yieldable die, to stretch the color film around the back portion of each sphere, and having thereafter been heated to cure the binder coating and anneal the cushion layer, thereby stabilizing the structure in the previously described final state.

PHILIP V. PALMQUIST.
RAYMOND E. PENROD.

REFERENCES CITED

The following references are of record in the file of this patent:

UNITED STATES PATENTS

| Number | Name | Date |
| --- | --- | --- |
| 2,214,369 | Hammarbach | Sept. 10, 1940 |
| 2,354,049 | Palmquist | July 18, 1944 |
| 2,379,741 | Palmquist | July 3, 1945 |
| 2,383,884 | Palmquist | Aug. 28, 1945 |
| 2,407,680 | Palmquist et al. | Sept. 17, 1946 |
| 2,440,584 | Heltzer | Apr. 27, 1948 |